United States Patent [19]

Chen et al.

[11] Patent Number: 5,832,365
[45] Date of Patent: Nov. 3, 1998

[54] COMMUNICATION SYSTEM COMPRISING AN ACTIVE-ANTENNA REPEATER

[75] Inventors: Young-Kai Chen, Berkeley Heights; Jenshan Lin, Pine Brook, both of N.J.

[73] Assignee: Lucent Technologies Inc., Murray Hill, N.J.

[21] Appl. No.: 723,812

[22] Filed: Sep. 30, 1996

[51] Int. Cl.$^6$ .................................................. H04B 7/14
[52] U.S. Cl. ........................... 455/15; 455/7; 455/276.1; 455/562
[58] Field of Search ................................ 455/7, 9, 10, 16, 455/15, 17, 20, 25, 562, 272, 275, 276.1, 504, 506; 370/315, 317, 318; 375/211

[56] References Cited

U.S. PATENT DOCUMENTS

| | | | |
|---|---|---|---|
| 2,635,233 | 4/1953 | Homrighous | 455/15 |
| 2,786,133 | 3/1957 | Dyke | 455/276.1 |
| 4,661,993 | 4/1987 | Leland et al. | 455/276.1 |
| 5,023,930 | 6/1991 | Leslie | 455/9 |
| 5,559,806 | 9/1996 | Kurby et al. | 455/13.3 |

*Primary Examiner*—Wellington Chin
*Assistant Examiner*—Lee Nguyen

[57] ABSTRACT

An indoor wireless communications system using two-way active-antenna repeaters to distribute signals received from external signal sources within an office, and to extend the range of cordless phone units in use there, is disclosed. The repeaters provide menu-selectable phase-shifting, selectable receiver sensitivity and transmitter power, and selectable signal format conversion to provide added privacy and to prevent interference with communication links in use by third parties within the building. Pattern selection is done by empirical adjustment of an antenna pattern suited to the general floor plan of the area served.

5 Claims, 3 Drawing Sheets

COMMUNICATION SYSTEM COMPRISING AN ACTIVE-ANTENNA REPEATER

BACKGROUND OF THE INVENTION

1. Field of the Invention

The present invention is broadly directed to antennas for use with wireless-communications devices. More particularly, the present invention pertains to antennas for use with portable wireless communications devices.

2. Discussion of Related Art

In urban wireless communications, shadowing, shielding and multipath are notorious villains, interfering with external cellular and broadcast communications at every turn. Within individual buildings in the city, one way of reducing the problem is to hardwire indoor communications terminals that are installed within the building to a communications distribution center operated by the building's management.

Such a communications center is a collection of signal converters and amplifiers, conventionally located in a machine room in the building's basement, or some other low-priority space. That center is fed broad-spectrum signals from one or more roof-mounted antennas. The roof-top feed line needs to be well-shielded; optical connections are preferable, wherever possible, to eliminate interference from sources of electromagnetic radiation in the building's internal environment between the roof and the basement.

However this hard-wired, high-maintenance, one-size-fits-all solution to the environmental problems affecting the wireless signals available to tenants inside the building provides mediocre service for most, and does not address the needs of truly wireless portable phones, faxes and modems at all. Furthermore, even for hard-wired terminals, a system that must provide general spectrum coverage cannot be fine-tuned to optimize the signal from a particular signal source that may be critically important to a particular use. For example, the stock tickers that are critically important to investment-oriented businesses may operate within the Local Multipoint Distribution Services (LMDS) allocation at 30 GHz, far outside the usual spectral requirements of non-technical users.

To provide satisfactory service, the central distribution system must accommodate wide variations in signal strength and noise tolerance and the attendant, widely divergent demands on the receiving antennas, converters and amplifiers. Even when the needs of present tenants have been met, spectrum reallocation may change the needs of some tenants almost overnight. For example, 1.9 GHz was recently added to the Personal Communications allocation for use by the rapidly growing cellular-phone services.

The shielding effects of girders, pipes and electrical conduits in the interior walls and floors of a building may also severely limit the range of cordless phones and other wireless links that operate within the building's interior. A roof antenna system does not address this problem.

SUMMARY OF THE INVENTION

In accordance with the present invention, reception within a building of signals external and internal to a building is improved by selective use of one or more repeaters in a workspace within a building.

A repeater in accordance with the present invention comprises a receiver section, a transmitter section, a phase-shift element and first and second antenna elements in one of said sections. The phase-shift element provides a selectable phase shift between a given signal that is supplied to the first antenna element and the given signal when it is supplied to the second antenna element. A controller is connected to the phase-shift element to select the phase shift applied to the signal supplied to the second antenna.

In a preferred embodiment, the repeater provides two-way communications. Preferably the controller also converts the frequency and selects the power and format of the signal it transmits, as required by local potential-interference and privacy concerns.

In a particular embodiment, the antenna pattern is selected by first choosing a theoretical antenna pattern that best fits the area that the antenna is required to serve and then empirically adjusting the actual pattern. The pattern is empirically adjusted by altering the location of the antennas or selecting a second pattern that compensates for environmental conditions that cause the actual pattern to omit portions of the desired coverage area.

BRIEF DESCRIPTION OF THE DRAWINGS

The invention will be better understood when the detailed description of a preferred embodiment, given below, is considered in conjunction with the drawings provided, wherein.

In these drawings, like elements are assigned like reference numerals.

DETAILED DESCRIPTION OF THE PREFERRED EMBODIMENTS

Figure 1:
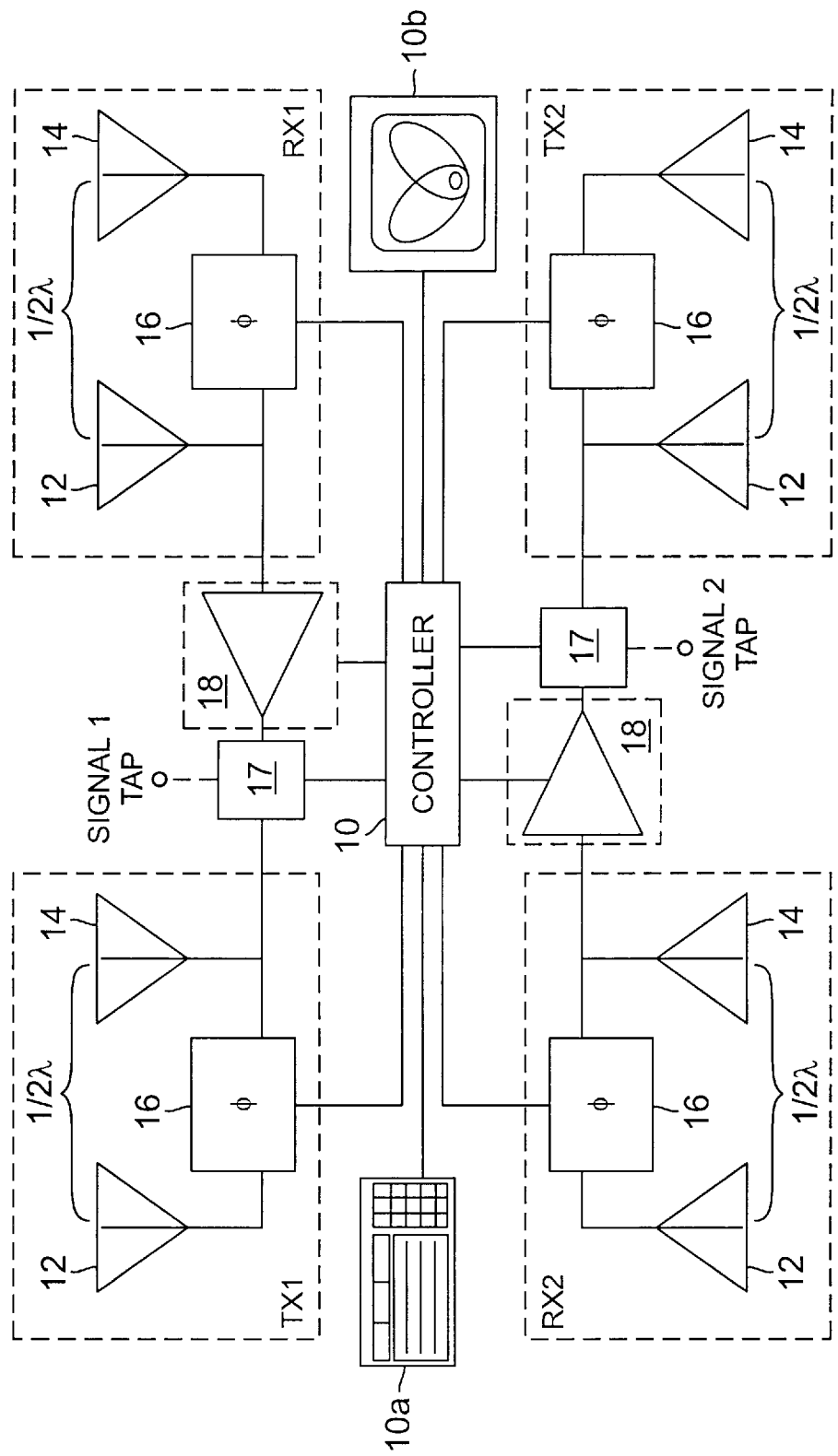
FIG. 1 shows an active-antenna repeater device in accordance with the present invention.

With reference now to FIG. 1, a two-way active-antenna repeater device constructed in accordance with the present invention comprises four sections RX1, RX2, TX1 and TX2, and a programmable controller 10. A pair of antennas 12, 14 is provided at each end (TX, RX) of each channel (1, 2). The antenna system is "active" in that effect of the physical geometry of the antennas in each section of the repeater on its coverage pattern can be modified electrically.

To provide variable coverage, the antennas 12, 14 are spaced a half-wave apart from each other. The signal of one of the antennas 12, 14 in each pair is then electrically phase-shifted by a given amount to control the directionality and range of the combined antenna signal of each section of the repeater, using a variable phase shiftet 16 in a suitable manner, as is well-known in the art. A signal processor 17 permits the signal to be used directly or converted to another signal frequency, or to modify the signal's format to prevent local interference. Thus, the controller 10 of FIG. 1 permits the user to select the frequency and format of the repeated signal, and the effective signal-sensitivity patterns of the receiving antennas RX1, RX2, and the signal-strength patterns of the transmitting antennas TX1, TX2 for each channel.

Figure 2:
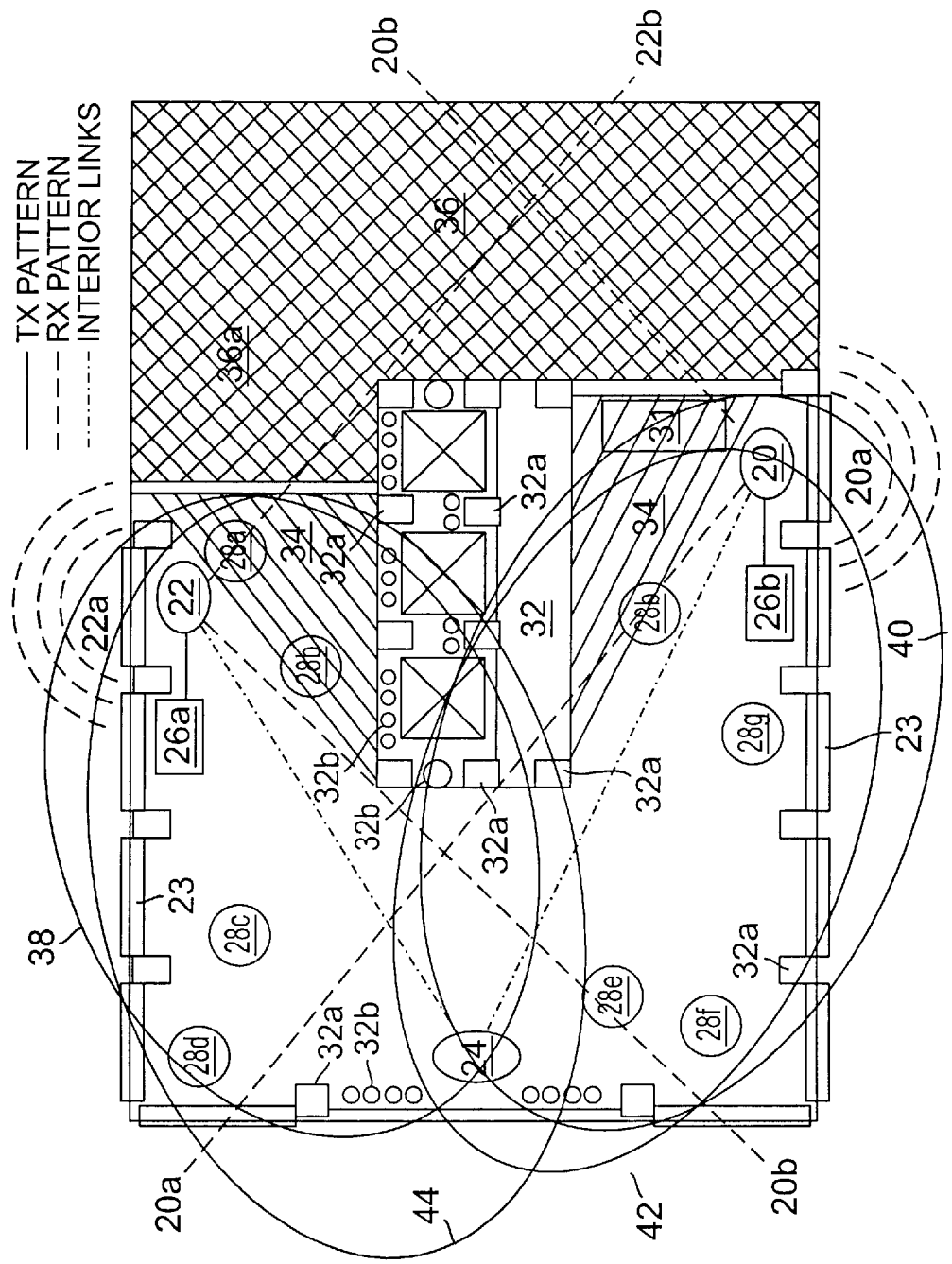
FIG. 2 is a schematic diagram of a multiple repeater-unit system for a business office in a high-rise building.

Multiple repeater devices 20, 22, 24 can be advantageously used to boost the signals available to wireless stock-market ticker and news service terminals 26 and cordless phones 28 in a single work space. In FIG. 2, two repeaters 20, 22 are placed in separate areas near a south-east and a north-east window 23 of an upper floor of a high-rise building 30, respectively. These first two repeaters provide improved reception of signals from any signal sources receivable in most of the 360° circumference of the building 30, with much less attenuation than these signals exhibit when they are received directly at most of the desktop locations 26, 28 on the floor.

In FIG. 2, an internal-signal repeater 24 has been placed opposite the west end of the elevator core 32 of the building, primarily to extend the range of cordless phones 28 in use on the floor. The elevator core 32 is an area with a particularly high density of steel girders 32a and metal conduit 32b of all types. These grounded conductive elements 32a, 32b are, in effect, a tall Faraday cage that shields the core from most electromagnetic transmissions, blocking their reception on the opposite side of this "cage". Thus, the handset of cordless phone 28a may not be usable on in the area near cordless phone base station 28h on the opposite end of the floor. The external signal repeaters 20, 22 cannot reliably serve the respective opposite ends of the room, without the assistance of the "cordless-phone" repeater 24.

Similarly, any transmission from the cordless-phone repeater 24 to areas shadowed by the elevator core 32, particularly in the shaded areas in north-east and south-east corners 34 of the respective ends of the office 30 shown in FIG. 2, will be severely compromised unless the first and second repeaters 20, 22 provide an intermediate relay point. It will be recognized by one skilled in the art that the transmission patterns shown for the repeaters in FIG. 2, is the free-space transmission pattern determined by antenna-signal phase and antenna geometry. The actual transmission patterns are, of course, a complex combination of signal shadows and reflections.

Transmissions from the second external-signal repeater 22, in particular, are severely limited by the grounded structures 32a, 32b in and around the nearby elevator core 32 of the building. Thus, the internal cordless-phone repeater 24 must serve double duty. In addition to replicating cordless phone signals received from one side of the floor for handsets carried to the other side of the floor, this internal repeater 24 must link the signals transmitted by the external signal repeaters 20, 22 in each shielded corner of the floor to the opposite side of the floor.

It should also be noted that the first external-signal repeater has been phase-adjusted by the controller to have an overall reception angle 20b that is much wider than its transmission angle 42, while attenuating any interference generated by the nearby copier-machine motor 31. Each external-signal repeater 20 will be particularly sensitive to signals 20a, 22a originating outside its respective window area 23, because that is a minimally-shielded reception area, but each will pick up signals accessible within approximately a 250-degree arc. Overlapping the reception of the external-signal repeaters 20, 22 helps to reduce the interference caused by internal building systems 32a, 32b.

FIG. 2 also shows that the entire north-east and south-east corners of the building are leased by a separate tenant 36. In this circumstance, merely increasing the signal strength of the cordless phones' base stations 28 or using repeaters to rebroadcast weak signals would be likely to interfere with the other tenant's communications in that adjacent area 36, particularly in the north-east corner 36a. Specifically, increasing base-station power would violate the FCC standards for cordless phones. (Any interference by local transmitters with standard signal sources can quickly become a tangle of regulatory red tape and are best prevented by use of frequencies and formats that do not conflict with neighbor's communications operations.) Also, arbitrary local rebroadcast of internal or external communications signals may compromise the small margin of privacy provided by cordless phones 28 without some such conversion or encoding. The options offered by frequency and format conversion are important for addressing both of these types of problems.

To minimize the signal level transmitted toward the other tenant's premises 36, the controller 10 sets the phase shifter 16 to a suitable phase-shift angle so that the interior repeater 24, for example, produces a respective single-lobed transmission pattern 38 and 40 on each side of the elevator core for its two-way transmissions. The transmitter sections of the first and second repeaters 20, 22 are also phase-controlled and power limited so that their signals are not directed into the adjacent space held by the other tenant 36. Carrier-frequency or format conversion may be required to assure privacy and prevent interference in specific circumstances.

It may be desirable to frequency shift some externally-sourced signals for internal re-transmission within the 2.5 to 5.0 GHz range allocated for internal communications. Local spread spectrum encryption may also be used, to prevent the increased effective strength of the cordless phones' signals from decreasing the privacy of their calls, for example. Thus, the internal cordless phone signals can be supplied to and from the shadowed areas of the floor 34 by the central repeater 24, without jeopardizing the existing level of privacy by boosting the omnidirectional power of the individual cordless-phone base stations, and with minimal effect on that neighbor-tenant's office space 36.

In FIGS. 1 and 2, the controller 10 in each repeater receives instructions from the operator. The controller 10 in FIG. 1 provides user-friendly control of the repeater operation through a keyboard 10a and a flat-panel display 10b. The flat-panel display 10b shows theoretical antenna transmission and reception patterns and antenna-pattern-selection menus provided by the controller 10, which is a microprocessor. The operator's menu selections specify the desired antenna angles, receiver sensitivity and transmitter power, and any frequency or format conversions that are required.

In particular, icons representing the geometry of antenna patterns theoretically produced by given sets of phase and gain parameters can be displayed for use by office staff, without specialized technical knowledge and without reiterative, actual field-strength measurements, for use in selecting optimum coverage areas for each repeater installed in the office. The initial selection of antenna-pattern parameters is made based on the best theoretical fit to the general floor plan of the office area to be served. The patterns displayed by the controller can then be used to provide direction for empirical adjustments in the repeater's location and antenna pattern parameters to compensate for any problems encountered in operations using the pattern selected as the theoretical best fit for the office floor plan. A slightly different pattern or repeater location may be tried in view of the reception problems identified in such operations.

The actual structural plan of the building is often not available. Even if the structural floor plan is known, modelling the actual signal strength patterns is not practical, and the measurement and interpretation of actual signal field strength is for engineering experts. However, in accordance with this embodiment, in many cases adjustments can be made by administrative personnel to compensate for environmental conditions affecting the actual coverage produced by the initially-selected antenna pattern parameters, without extensive technical assistance. In this way, active-antenna parameters can be selected to resolve real-world antenna-coverage problems through a pragmatic evaluation of the effectiveness of apparently-suitable theoretical antenna-coverage patterns.

Figure 3:
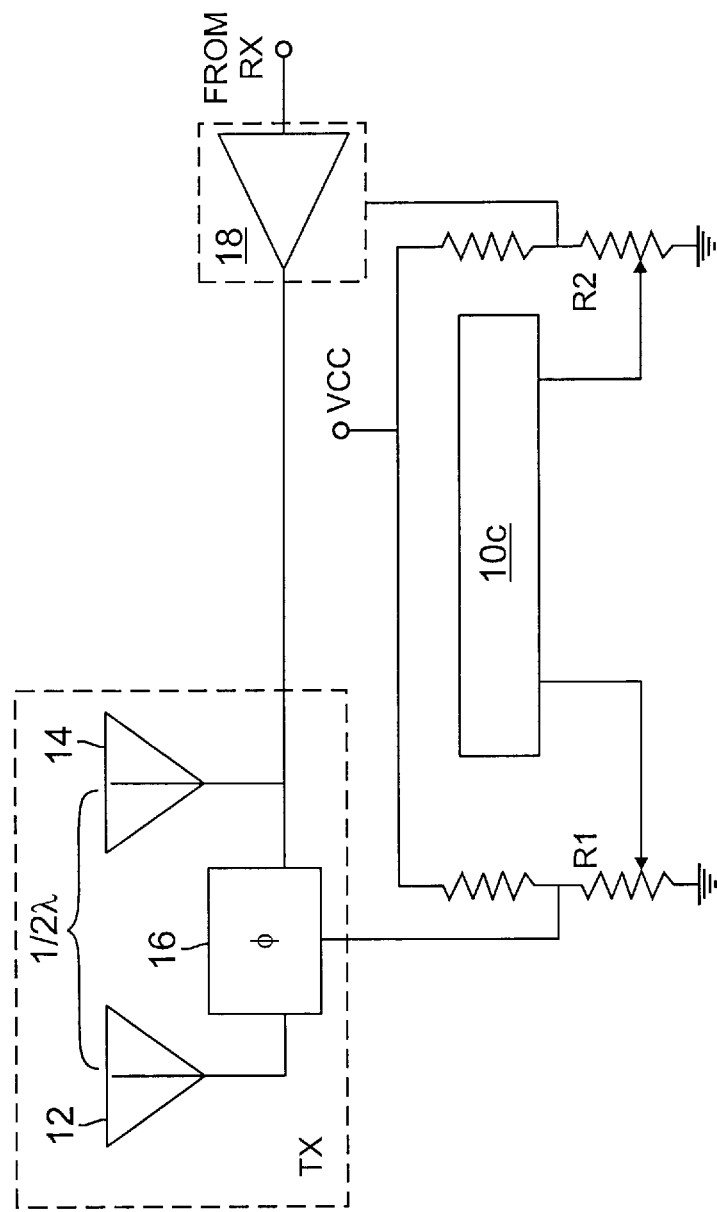
FIG. 3 shows a variable-gain, variable-pattern active antenna circuit for providing programmable-geometry antenna patterns.

Alternatively, the controller may be designed for installation and maintenance by technicians. Thus, for the sake of simplicity and low cost-per-unit, the phase and gain resistors R1, R2 may be potentiometers that are directly adjusted by the technician. FIG. 3 is a circuit diagram of a simple technician-adjusted controller circuit 10 for active-antenna sections usable in the bi-directional repeater of FIG. 1. In this circuit the input/output device is an access panel 10c providing a pair of manual actuators, perhaps slider or rotor knobs, that vary R1 and R2, respectively, and a set of test-point terminals for connecting test instruments for verifying that the necessary phase-shift and gain parameters have been provided for the antennas' intended signal patterns.

Active antenna elements can be fabricated monolithically, as an integrated circuit, for wavelengths in the millimeter range, particularly the 60 GHz frequency range used for indoor wireless communications in Japan and Europe. For conventional personal communications repeaters, however, a pair of dipole antennas would be used as the antennas 12, 14 in each section of the repeater. The repeater will nevertheless still be quite compact. At most, each 900 MHz cellphone-band antenna requires only an area 6 inches (15 cm.) square and those for higher frequency allocations would be smaller still.

The invention has been described with particular reference to presently-preferred embodiments thereof. For instance, it could also be used in combination with a repeater for broadcast-band frequencies.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A user-configurable repeater having a receiving section and a transmitting section and being installed at a particular location of a plurality of locations, said repeater comprising:
   a first pair of antenna elements in one of said sections for one of receiving and transmitting a signal in a predetermined coverage pattern area, said signal passing between said antenna elements of said first antenna element pair;
   a first phase-shifting means, connected between said antenna elements of said first antenna element pair in said one of said sections, operable for selectively changing said predetermined coverage pattern area to one of a plurality of unique coverage pattern areas by providing a phase shift of a selectable value from a plurality of selectable values to said signal when said signal passes therethrough, wherein each of said plural selectable phase shift values corresponds to each of said plural unique coverage pattern areas;
   display means for displaying to the user a visual representation of each of said plural unique coverage pattern areas and of configuration data representative of instructions for selecting a particular unique coverage area pattern from said plural unique coverage pattern areas, so as to provide optimal repeater performance in the particular installed location, wherein said instructions comprise instructions for selecting a particular phase shift value corresponding to said particular unique coverage area pattern; and
   control means, connected to said first phase shifting means, operable for enabling the user to select said particular unique coverage pattern area by selecting said particular phase shift value in accordance with said configuration data displayed by said display means, and for triggering said first phase shifting means when the user selects said particular phase shift value.

2. The repeater of claim 1, further comprising:
   a second pair of antenna elements in the other of said receiving and transmitting sections for the other of receiving and transmitting said signal in a predetermined coverage pattern area, said signal passing between said antenna elements of said second antenna element pair; and
   a second phase-shifting means, connected between said antenna elements of said second antenna element pair in the other one of said sections, and connected to said control means, wherein said control means is further operable for triggering said second phase shifting means when the user selects said particular phase shift value.

3. The repeater of claim 1, wherein said configuration data further comprises instructions for selecting, for application to said signal, a particular amplifier gain that provides optimal repeater performance in the particular installed location, and wherein said signal passes from said receiver section to said transmitter section, the repeater further comprising:
   an amplifier, responsive to said control means and connected between said receiver and transmitter sections, for applying a selectable amplifier gain to said signal, wherein said control means is further operable for enabling the user to select said particular amplifier gain in accordance with said configuration data displayed by said display means and for triggering said amplifier when the user selects said particular amplifier gain.

4. The repeater of claim 1, wherein said configuration data further comprises instructions for selecting, for application to said signal, a particular carrier frequency from a predetermined carrier frequency range to provide optimal repeater performance in the particular installed location, and wherein said signal passes from said receiver section to said transmitter section, the repeater further comprising:
   signal processing means, responsive to said control means and connected between said receiver and transmitter sections, operable for selectively converting said signal to said particular carrier frequency, wherein said control means is further operable for enabling the user to select said particular carrier frequency from said predetermined carrier frequency range in accordance with said configuration data displayed by said display means, and for triggering said signal processing means when the user selects said particular carrier frequency.

5. The repeater of claim 1, wherein said configuration data further comprise instructions for selecting, for said signal, a particular signal format from a plurality of signal formats, to provide optimal repeater performance in the particular installed location, wherein said signal passes from said receiver section to said transmitter section, and wherein said signal processor further comprises:

signal conversion means, responsive to said control means and connected between said receiver and transmitter sections, operable for selectively converting said signal to said particular signal format of said plurality of signal formats, wherein said control means is further operable for enabling the user to select said particular signal format from said plurality of signal formats in accordance with said configuration data displayed by said display means, and for triggering said signal conversion means when the user selects said particular signal format.

* * * * *